United States Patent [19]

Needham

[11] 4,134,874

[45] Jan. 16, 1979

[54] PROCESSING AID FOR POLY(ARYLENE SULFIDE) RESINS

[75] Inventor: Donald G. Needham, Bartlesville, Okla.

[73] Assignee: Phillips Petroleum Company, Bartlesville, Okla.

[21] Appl. No.: 834,201

[22] Filed: Sep. 19, 1977

[51] Int. Cl.$^2$ ............................................. C08L 81/04
[52] U.S. Cl. .............................. 260/37 SB; 260/897 R
[58] Field of Search ................ 260/37 R, 28 R, 897 R

[56] References Cited

U.S. PATENT DOCUMENTS

| | | | |
|---|---|---|---|
| 3,354,129 | 11/1967 | Edmonds et al. ...................... 260/79 |
| 3,925,530 | 12/1975 | Rees ..................................... 264/297 |
| 4,025,582 | 5/1977 | Needham .......................... 260/897 R |

Primary Examiner—Lewis T. Jacobs

[57] ABSTRACT

A method for improving processability of compositions of normally solid polymers of arylene sulfide by the addition of an amount of solid ethylene polymer effective to improve the processability of the composition. A composition of matter of normally solid poly(arylene sulfide) and an amount of solid ethylene polymer effective to improve processability of the composition. In a preferred embodiment the amount of solid ethylene polymer in the total composition is in the range of about 0.1 to about 5 weight percent.

8 Claims, No Drawings

PROCESSING AID FOR POLY(ARYLENE SULFIDE) RESINS

BACKGROUND OF THE INVENTION

This invention relates to poly(arylene sulfide) and, more particularly, to compositions of arylene sulfide polymer and filler materials. In another of its aspects this invention relates to processing arylene sulfide polymer and filled arylene sulfide polymer. In yet another aspect of the invention it relates to the addition of ethylene polymers to polymeric compositions.

In most applications in which arylene sulfide polymer is molded, the arylene sulfide polymer must be filled with a relatively large amount of filler materials such as fiberglass, graphite and/or mineral fibers. These high loadings of fillers cause a significant reduction in flow which can result in difficulty in compounding and injection molding. It has now been found that the addition of a small amount of ethylene polymer to the filled arylene sulfide polymer compositions can considerably increase the flow properties of the total composition. Although it has been known to add relatively large amounts of ethylene polymer into arylene sulfide polymer compositions, the special ability of small amounts of ethylene polymers to improve processability of arylene sulfide polymer compositions has hitherto been unrecognized.

It is therefore an object of this invention to improve the processability of arylene sulfide polymer compositions. It is also an object of this invention to provide a polymeric composition comprising arylene sulfide polymer and ethylene polymer in which the composition has improved processability over arylene sulfide polymer compositions that do not contain ethylene polymer.

Other aspects, objects, and the various advantages of this invention will become apparent upon the study of this application and the appended claims.

STATEMENT OF THE INVENTION

A method is provided for improving the processability of compositions comprising normally solid polymers of arylene sulfide by the addition thereto of an amount of solid ethylene polymer effective to improve the processability of the composition. In a preferred embodiment the amount of solid ethylene polymer is in the range of about 0.1 to about 5 weight percent of the total composition.

In another embodiment of the invention a composition of matter is provided in which is incorporated a solid ethylene polymer in an amount in the range of about 0.1 to about 5 weight percent of the total composition along with normally solid poly(arylene sulfide).

The ethylene polymers contemplated contain generally from about 90 to 100 mole percent ethylene. The comonomer, when used, is selected from an aliphatic mono-1-olefin containing from 3 to about 10 carbon atoms per molecule, particularly propylene, 1-butene, 1-hexene, 1-octene and 1-decene. A presently preferred resin is polyethylene. The melt index of the polyethylene used in this fashion preferably ranges from about 1 to about 50, as determined according to ASTM D 1238-65T, condition E, to provide a balance of good dispersion with the poly(arylene sulfide) compositions as well as improved processability of the final compositions. The ethylene polymer can be prepared by any prior art method such as that described according to U.S. Pat. No. 2,825,721 issued Mar. 4, 1958 to Hogan and Banks utilizing a supported chromium oxide catalyst. Another suitable method of producing useful ethylene polymers is disclosed in U.S. Pat. No. 3,903,017 issued Sept. 2, 1975 to Ziegler et al, utilizing a catalyst comprising titanium trichloride and an organoaluminum compound.

Although it can be stated that the addition of any amount of ethylene polymer aid in the processability of polymers of arylene sulfide, based on practical considerations, a range can be specified for a preferred quantity of ethylene polymer used. Below about 0.1 weight percent of the composition, the beneficial effect on processability becomes too low to be useful. Above about 5 weight percent of the total composition, the physical properties of the molded compositions, e.g., flexural modulus, impact strength, etc. are significantly reduced.

The poly(arylene sulfide) resins, often abbreviated PAS, contemplated in the compositions include those described in U.S. Pat. No. 3,354,129 issued to Edmonds and Hill on Nov. 21, 1967. The presently preferred polymer is poly(phenylene sulfide), often abbreviated PPS.

The term poly(arylene sulfide) includes homopolymers and the normally solid arylene sulfide copolymers, terpolymers, and the like having melting or softening points of at least 300° F. (149° C.) and more preferably from about 400 to about 900° F. (204°–482° C.). Other examples of poly(arylene sulfides) are poly(4,4'-biphenylene sulfide), poly(2,4-tolylene sulfide), a copolymer from p-dichlorobenzene, 2,4-dichlorotoluene and sodium sulfide, and the like.

The invention is particularly directed to improving processability characteristics of poly(arylene sulfide) admixed with fillers, e.g., clay, talc, iron oxide, carbon black, glass, and the like and mixtures thereof. The amount of filler can constitute up to about 75 weight percent of the total composition. Good results are obtained, for example, with compositions containing from about 50–65 weight percent filler, about 0.5–2 weight percent polyethylene and the balance poly(phenylene sulfide).

The mode of mixing or blending compositions useful by the present process include the conventional processes known in the art. Particularly useful is dry blending in a commercial apparatus followed by extrusion and pelleting using commercial apparatus.

EXAMPLE

Dry blends of PPS powder (produced in accordance with U.S. Pat. No. 3,354,129 and precured thermally to a melt flow of 215 as determined by ASTM D 1238-70 at 316° C. and 5 kg weight), polyethylene fluff having a melt index of 30 and a density of 0.963 g/ml (produced in accordance with U.S. Pat. No. 2,825,721) and several fillers were prepared by intensive mixing in a Henschel mixer at ambient temperature at 1000 RPM. The mixing cycle was 5½ minutes in length. All components except glass fibers were mixed for 5 minutes, after which the glass was added and the composition mixed an additional 30 seconds. Each blend was further processed by passage through a 2½ inch (67.75 mm) extruder equipped with a 24:1 L/D screw at a stock temperature of 600° F. (316° C.), converted into strands and chopped into pellets.

The fillers employed are described as follows:

Clay — treated kaolin clay, surface area of 22 m$^2$/g (B.E.T.), mean particle diameter of 0.3 microns (0.3 × 10$^{-6}$m), 1% maximum moisture content purchased from J. M. Huber Corp., Edison, NJ as grade Nucap 200-L.

Talc — medium oil absorption, high brightness, general purpose talc with a Hegman fineness grind of 4 purchased from Whittaker, Clark & Daniels, Inc., Plainfield, NJ as grade Pioneer 2620.

Glass — chopped strands, ⅛" long × 0.00062" n diameter (3.2 mm × 0.016 mm) a product of Owens-Corning Fiberglas Corp., Toledo, OH, designated as grade 497-BB.

Carbon black — A product of Phillips Petroleum Co., with an ASTM D 1765 designation of N-550.

Invention composition A, in parts by weight, consisted of PPS — 44.5, clay — 17.5, talc — 17.5, glass — 20.0 and polyethylene — 0.5.

Control composition A', in parts by weight, consisted of PPS — 45.0, clay — 17.5, talc — 17.5 and glass — 20.0.

Invention composition B, in parts by weight, consisted of PPS — 38.0, clay — 10.0, glass — 48.0, carbon black — 2.0, and polyethylene — 2.0.

Control composition B', in parts by weight, consisted of PPS — 40.0, clay — 10.0, glass — 48.0 and carbon black — 2.0.

The test specimens for tensile strength and elongation, flexural modulus and flexural strength and Izod impact strength were prepared by injection molding of the pellets in a 2 oz. (56.8 g) machine at a stock temperature of 600° F. (316° C.) and a mold temperature of 100° F. (38° C.). The arc resistance samples were compression molded from the pellets.

The spiral flow specimens were prepared in the above described machine at a stock temperature of 615° F. (324° C.), a mold temperature of 200° F. (93° C.), maximum injection speed and a gage pressure of 18,500 psi (1280 MPa).

The results obtained are presented in Table 1.

Table 1

| Physical Properties Of PPS Compositions | | | | |
|---|---|---|---|---|
| Run No. | 1 | 2 | 3 | 4 |
| Composition | A | A' | B | B' |
| Tensile strength, (1) | | | | |
| psi | 13,100 | 13,300 | 15,300 | 17,200 |
| MPa | 90.3 | 91.7 | 105 | 119 |
| Elongation, %(1) | 0.70 | 0.70 | 0.80 | 0.61 |
| Flexural modulus,(2) | | | | |
| psi | 1,771,000 | 1,834,000 | 2,245,000 | 2,505,000 |
| GPa | 12.21 | 12.64 | 15.48 | 17.27 |
| Flexural strength,(2) | | | | |
| psi | 18,800 | 20,200 | 26,200 | 29,500 |
| MPa | 130 | 139 | 181 | 203 |
| Izod impact,(3) room temperature, notched, | | | | |
| ft. lbs./inch | 0.64 | 0.63 | 0.85 | 1.25 |
| joules/meter | 35 | 34 | 46 | 67 |
| unnotched, room temp. | | | | |
| ft. lbs./inch | 2.42 | 2.43 | 3.81 | 5.60 |
| joules/meter | 131 | 131 | 206 | 302 |
| Arc resistance(4) | 224 | 204 | nd(5) | nd(5) |
| Spiral flow | | | | |
| Weight (avg.) grams | 8.7 | 8.0 | 7.6 | 6.4 |
| Length (avg.) inches | 20.5 | 18.2 | 20.0 | 15.0 |

Table 1-continued

| Physical Properties Of PPS Compositions | | | | |
|---|---|---|---|---|
| Run No. | 1 | 2 | 3 | 4 |
| centimeters | 52.1 | 46.0 | 50.8 | 38.1 |

Notes:
(1)ASTM D 638, crosshead speed of 0.2"/min. (0.5 cm/min.).
(2)ASTM D 790
(3)ASTM D 256
(4)ASTM D 495
(5)nd means not determined.

The spiral flow results clearly demonstrate that the incorporation of a minor amount of polyethylene in filled PPS increases the amount of composition injected into the mold relative to its control composition. In comparing the physical properties of invention composition A (run 1) with control composition A' (run 2), it is evident that little change in physical properties has occurred. In comparing the physical properties of invention composition B (run 3) with control composition B' (run 4), it is seen that inclusion of 2 weight percent polyethylene generally decreases the physical properties to a greater extent than does inclusion of 0.5 weight percent. A more exact comparison is not possible since the compositions vary in fillers used and quantities employed. However, the physical properties are adequate and the advantage gained in processability is quite desirable from a molding viewpoint.

I claim:

1. A method for improving processability of compositions of matter comprising normal polymer of arylene sulfide which comprises the addition of an amount of solid ethylene polymer in the range of about 0.1 to about 5 weight percent of the total composition said amount effective to improve processability of said composition.

2. A method of claim 1 wherein the total composition comprises filler in an amount of up to about 75 weight percent by weight of the total composition.

3. A method of claim 2 wherein about 50 to about 65 weight percent of the total composition is filler, about 0.5 to about 2 weight percent is polyethylene, and the remainder of the composition is poly(phenylene sulfide).

4. A method of claim 2 wherein filler is chosen from among glass, talc, iron oxide, carbon black, clays, and mixtures thereof.

5. A composition of matter comprising normally solid poly(arylene sulfide) and an amount of solid ethylene polymer in the range of about 0.1 to about 5 weight percent of the total composition said amount effective to improve processability of said composition.

6. A composition of claim 5 wherein the total composition comprises filler in an amount of up to about 75 weight percent by weight of the total composition.

7. A composition of claim 6 wherein about 50 to about 65 weight percent of the total composition is filler, about 0.5 to about 2 weight percent is polyethylene, and the remainder of the composition is poly(phenylene sulfide).

8. A composition of claim 6 wherein filler is chosen from among glass, talc, iron oxide, carbon black, clays, and mixtures thereof.

* * * * *